W. S. HAMM & W. F. STEWART.
SOLDER CUTTER AND FEEDER.
APPLICATION FILED APR. 24, 1916.

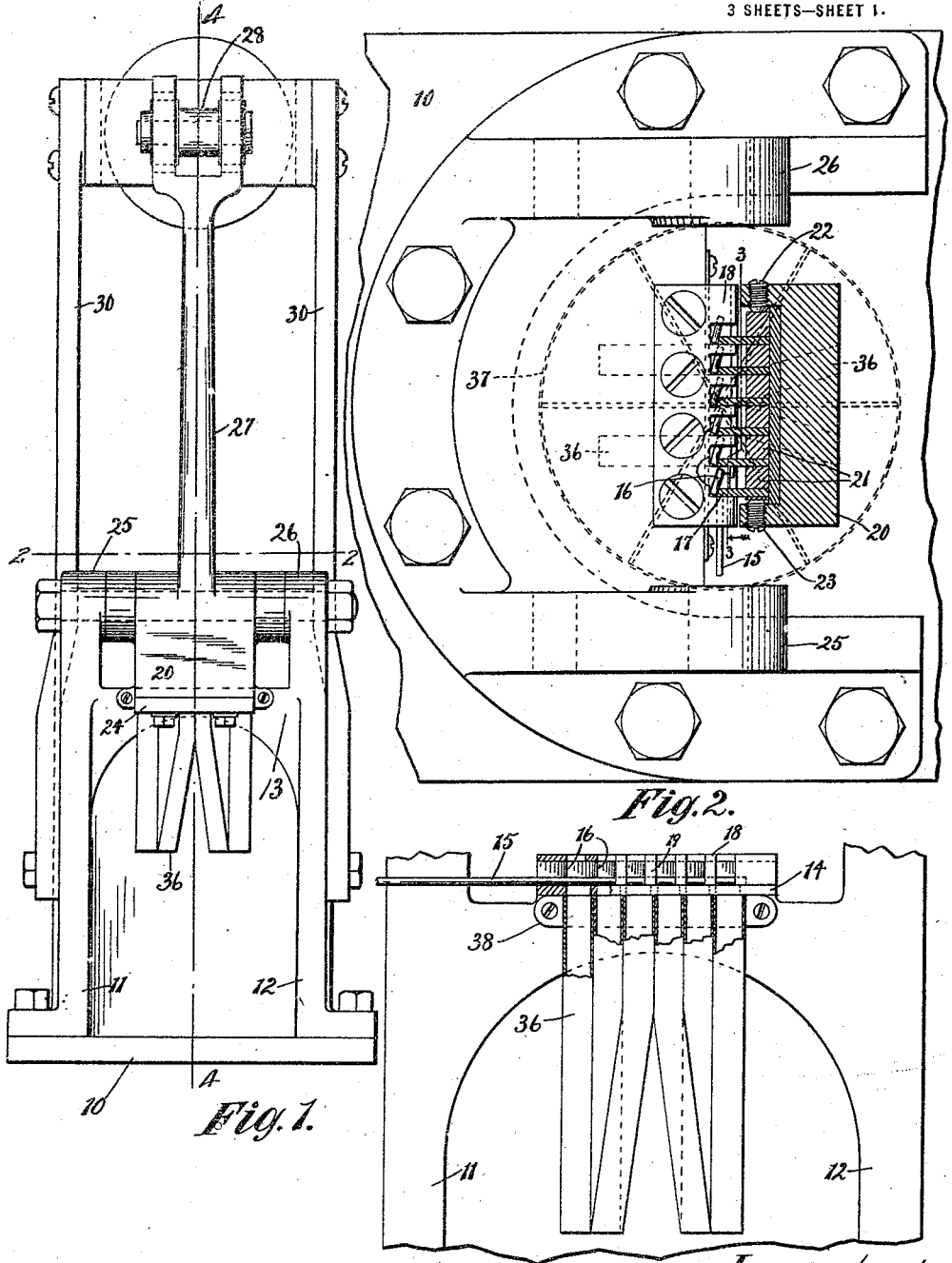

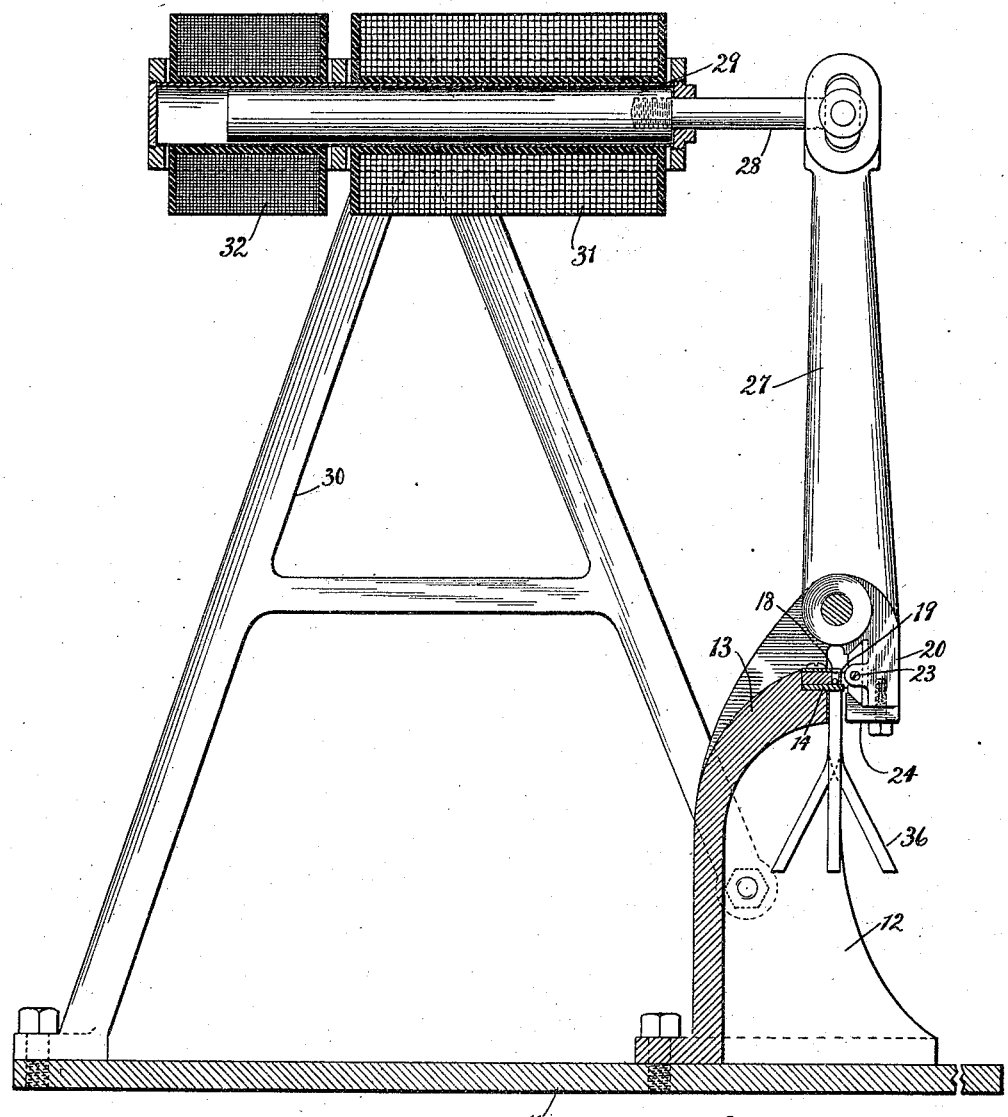
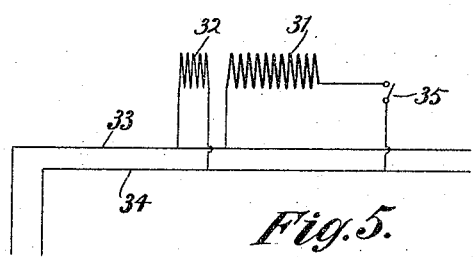

1,296,656.

Patented Mar. 11, 1919.
3 SHEETS—SHEET 3.

Inventors:
William S. Hamm
Wilber F. Stewart
By _____ Attys.

UNITED STATES PATENT OFFICE.

WILLIAM S. HAMM, OF HUBBARD WOODS, AND WILBER F. STEWART, OF CHICAGO, ILLINOIS, ASSIGNORS TO THE ADAMS & WESTLAKE COMPANY, OF CHICAGO, ILLINOIS, A CORPORATION OF ILLINOIS.

SOLDER CUTTER AND FEEDER.

1,296,656.             Specification of Letters Patent.    Patented Mar. 11, 1919.

Application filed April 24, 1916. Serial No. 93,170.

*To all whom it may concern:*

Be it known that we, WILLIAM S. HAMM and WILBER F. STEWART, citizens of the United States, and residents, respectively, of Hubbard Woods, county of Cook, and State of Illinois, and Chicago, county of Cook, State of Illinois, have jointly invented certain new and useful Improvements in Solder Cutters and Feeders, of which the following is a specification and which are illustrated in the accompanying drawings, forming a part thereof.

The invention relates to devices for cutting solder into suitable lengths for use and delivering the same to the work to which it is to be applied.

The objects of the invention are to provide a simple yet efficient device of this character, and an embodiment of it is illustrated in the accompanying drawings, in which—

Figure 1 is a front elevation;

Fig. 2 is a detail plan, partly in section, with some of the parts removed, viewed from the line 2—2 of Fig. 1;

Fig. 3 is a detail sectional view on the line 3—3 of Fig. 2, some parts being broken away;

Fig. 4 is a transverse vertical section of the apparatus;

Fig. 5 is a diagrammatic view of the electric motor for operating the apparatus;

Figure 6:
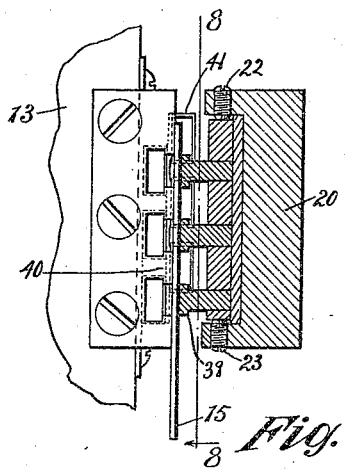
Figs. 6 and 7 are plan sections of the cutting elements in different positions and showing a modified form of construction.
Figure 7:
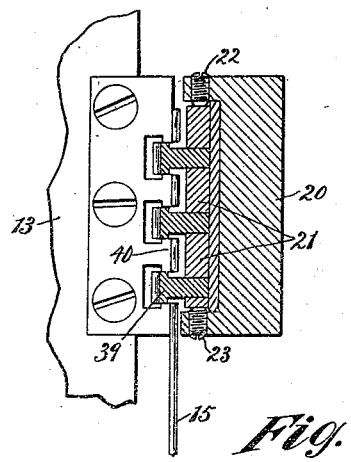
Figure 8:
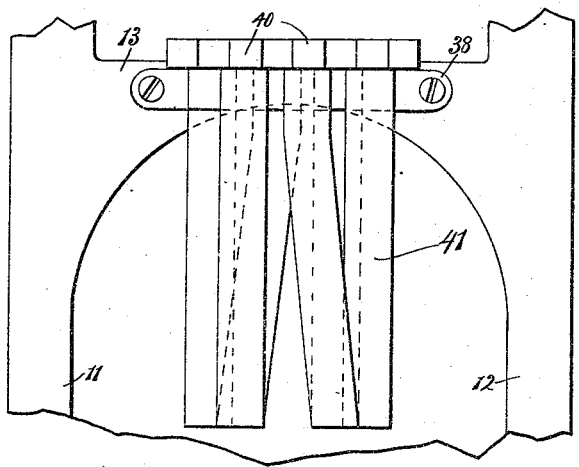
Fig. 8 is a detail section on the line 8—8 of Fig. 6 some of the parts being omitted.

The apparatus comprises a bed plate 10, from which rises a frame comprising a pair of legs 11, 12, united at their upper ends by a head portion 13. Secured within a suitable channel in the head and projecting horizontally is a solder supporting plate 14, over which the solder in wire form, as shown at 15, is fed. Immediately above the plate 14 there are provided a plurality of shearing abutments or stationary cutters, as 16, spaced apart a distance equal to the length of the pieces into which the solder is to be cut. In the construction shown in Fig. 2, these abutments take the form of a series of teeth, the backs of which are inclined.

A plurality of cutting blades, as 17, are carried by a movable jaw and coöperate with the abutments for shearing the solder. In the construction shown there are six such blades and abutments. A guard plate 18 is attached over the abutments, and has a depending lip 19 slotted to accommodate the cutting blades 17.

The cutting blades are clamped within a suitable aperture in the movable jaw 20, and are spaced apart by means of filler blocks 21 and locked in place by means of screws 22, 23, a bottom plate 24 being applied to the lower face of the jaw 20 and serving as a part of the holding means.

The jaw 20 is pivoted in upstanding lugs 25, 26, so that it may oscillate toward and away from the abutments 16. A crank arm 27 projects upwardly from the jaw 20, and is pivotally attached, by means of the rod 28, to the core 29 of a solenoid carried by a frame 30 rising from the bed 10. The solenoid comprises two coils 31, 32, connected independently across the lines 33, 34, of an electric circuit. The coil 32 is in a constantly closed circuit and performs the function of retracting the jaw. The coil 31 is of greater strength than the coil 32, and its circuit is provided with a manually controlled switch 35. When the circuit of this coil is closed, it overpowers the coil 32 and shifts the core so as to advance the jaw 20 and effect the cutting of the solder. When the switch is open the coil 32 attracts the core 29 and retracts the jaw.

Immediately below each of the abutments 16 there is located a conduit 36, which receives the piece of solder as it is cut and delivers it to a suitable receptacle and distributer for delivery to the work to which it is to be applied. Such a receptacle and distributer is shown in dotted lines at 37, (Fig. 2) but forms no part of the invention herein described. When such receptacle and distributer is employed it may rest upon the table 10 between the standards 11, 12, and the conduits 36 are directed one to each of its compartments. The conduits 36 may be conveniently secured in place by being attached by any suitable means to a plate 38, fixed to the head 13.

Figure 9:
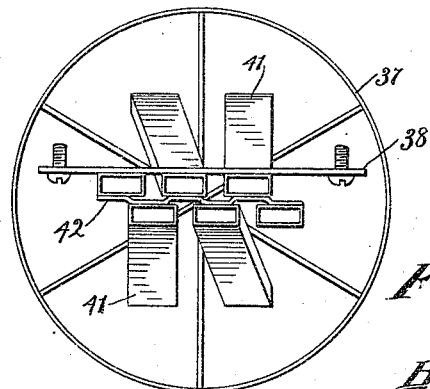
Fig. 9 is a detail plan view of the delivery conduits, and distributing device, which, however, forms no part of the present invention, being shown as in position to receive the solder from the conduits.

In the construction illustrated in Figs. 6 to 9, the movable and stationary cutters or abutments with which they coact, shown, respectively, at 39, 40, are identical in form, being T-shaped, each cutter coöperating with a pair of the abutments. The throats of the conduits 41 are arranged one directly in advance of each cutter and one directly in front of each abutment, in order that they may receive the pieces of solder as the cutters are advanced. The conduits being arranged in two series, as shown in Fig. 9, may be attached together by means of a plate 42 located between the two sets and to the plate 38.

The solder is cut into lengths corresponding with the width of the cutters 39 and the abutments 40, and the pieces are therefore free to fall between the stems, respectively, of the cutters and the abutments as the heads of the cutters are advanced between the abutments.

We claim as our invention:

In a solder cutter and distributer, in combination, a series of T-shaped stationary cutters, a series of T-shaped reciprocating cutters movable between and coöperating with the stationary cutters, and a series of conduits located below the cutters, one in advance of each cutting element.

WILLIAM S. HAMM.
WILBER F. STEWART.

Copies of this patent may be obtained for five cents each, by addressing the "Commissioner of Patents, Washington, D. C."